(12) United States Patent
Kolosnitsyn et al.

(10) Patent No.: US 9,219,271 B2
(45) Date of Patent: Dec. 22, 2015

(54) BATTERY ELECTRODE STRUCTURE

(71) Applicant: OXIS ENERGY, LTD., Oxfordshire (GB)

(72) Inventors: Vladimir Kolosnitsyn, Ufa (RU); Elena Karaseva, Ufa (RU)

(73) Assignee: Oxis Energy Limited, Oxfordshire (GB)

( * ) Notice: Subject to any disclaimer, the term of this patent is extended or adjusted under 35 U.S.C. 154(b) by 51 days.

(21) Appl. No.: 14/036,667

(22) Filed: Sep. 25, 2013

(65) Prior Publication Data

US 2014/0023924 A1 Jan. 23, 2014

Related U.S. Application Data

(63) Continuation of application No. 11/190,203, filed on Jul. 27, 2005.

(60) Provisional application No. 60/591,083, filed on Jul. 27, 2004.

(30) Foreign Application Priority Data

Jul. 27, 2004 (GB) .................................. 0416708.6

(51) Int. Cl.
*H01M 4/13* (2010.01)
*H01M 4/139* (2010.01)
(Continued)

(52) U.S. Cl.
CPC ........ *H01M 4/13* (2013.01); *H01M 4/06* (2013.01); *H01M 4/139* (2013.01); *H01M 4/366* (2013.01);
(Continued)

(58) Field of Classification Search
CPC ..... H01M 4/0404; H01M 4/13; H01M 4/366; H01M 4/64; H01M 6/14; H01M 10/052; H01M 10/0525; H01M 4/621; H01M 4/625; H01M 2004/021; C25B 11/0478; Y02E 60/122

USPC ......... 429/233, 234, 236, 237, 209, 142, 145, 429/144, 213, 217, 128; 204/290.01, 291

See application file for complete search history.

(56) References Cited

U.S. PATENT DOCUMENTS

| | | |
|---|---|---|
| 3,185,590 A | 5/1965 | Mayer et al. |
| 3,578,500 A | 5/1971 | Maricle et al. |

(Continued)

FOREIGN PATENT DOCUMENTS

| | | |
|---|---|---|
| EP | 0764489 | 2/2001 |
| EP | 0710995 | 3/2001 |

(Continued)

OTHER PUBLICATIONS

U.S. Appl. No. 60/721,062, filed Sep. 28, 2005, Kolosnitsyn et al.

(Continued)

*Primary Examiner* — Raymond Alejandro
(74) *Attorney, Agent, or Firm* — Meyertons, Hood, Kivlin, Kowert & Goetzel, P.C.; Eric B. Meyertons

(57) ABSTRACT

Solid composite electrodes with electrode active layers that include an electrode active material, an optional electron conductive material, an optional binder and other optional additives for batteries which are not fuel cells are provided. The solid composite electrodes are formed by the deposition of an electrode composition (slurry) onto a current collector in one or many layers. The electrode structure may be characterized by a porosity of the electrode composition layer that decreases in a direction from the back side of the layer (close to the current collector) towards the outer side of the layer. The electrode structures can be used in for example chemical sources of electric energy such as primary (non-rechargeable) as well as secondary (rechargeable) batteries.

11 Claims, 1 Drawing Sheet

(51) Int. Cl.

| | | |
|---|---|---|
| *H01M 4/36* | (2006.01) | |
| *H01M 4/38* | (2006.01) | |
| *H01M 4/58* | (2010.01) | |
| *H01M 10/0525* | (2010.01) | |
| *H01M 4/06* | (2006.01) | |
| *H01M 4/131* | (2010.01) | |
| *H01M 4/133* | (2010.01) | |
| *H01M 4/136* | (2010.01) | |
| *H01M 4/1391* | (2010.01) | |
| *H01M 4/1393* | (2010.01) | |
| *H01M 4/1397* | (2010.01) | |
| *H01M 4/505* | (2010.01) | |
| *H01M 4/60* | (2006.01) | |
| *H01M 4/62* | (2006.01) | |
| *H01M 10/0565* | (2010.01) | |
| *H01M 4/02* | (2006.01) | |

(52) U.S. Cl.
CPC .............. *H01M 4/382* (2013.01); *H01M 4/581* (2013.01); *H01M 10/0525* (2013.01); *H01M 4/131* (2013.01); *H01M 4/133* (2013.01); *H01M 4/136* (2013.01); *H01M 4/1391* (2013.01); *H01M 4/1393* (2013.01); *H01M 4/1397* (2013.01); *H01M 4/505* (2013.01); *H01M 4/60* (2013.01); *H01M 4/62* (2013.01); *H01M 10/0565* (2013.01); *H01M 2004/021* (2013.01); *Y02E 60/122* (2013.01)

(56) References Cited

U.S. PATENT DOCUMENTS

| | | |
|---|---|---|
| 3,639,174 A | 2/1972 | Kegelman et al. |
| 3,778,310 A | 12/1973 | Garth |
| 3,877,983 A | 4/1975 | Hovsepian |
| 3,907,597 A | 9/1975 | Mellors |
| 4,060,674 A | 11/1977 | Klemann et al. |
| 4,104,451 A | 8/1978 | Klemann et al. |
| 4,118,550 A | 10/1978 | Koch |
| 4,154,906 A | 5/1979 | Bubnick et al. |
| 4,163,829 A | 8/1979 | Kronenberg |
| 4,252,876 A | 2/1981 | Koch |
| 4,303,748 A | 12/1981 | Armand et al. |
| 4,410,609 A | 10/1983 | Peled et al. |
| 4,499,161 A | 2/1985 | Foos |
| 4,550,064 A | 10/1985 | Yen et al. |
| 4,690,877 A | 9/1987 | Gabano et al. |
| 4,725,927 A | 2/1988 | Morimoto et al. |
| 4,740,436 A | 4/1988 | Kobayashi et al. |
| 5,079,109 A | 1/1992 | Takami et al. |
| 5,219,684 A | 6/1993 | Wilkinson et al. |
| 5,460,905 A | 10/1995 | Skotheim |
| 5,462,566 A | 10/1995 | Skotheim |
| 5,529,860 A | 6/1996 | Skotheim |
| 5,582,623 A | 12/1996 | Chu |
| 5,587,253 A | 12/1996 | Gozdz et al. |
| 5,648,187 A | 7/1997 | Skotheim |
| 5,789,108 A | 8/1998 | Chu |
| 5,797,428 A | 8/1998 | Miller |
| 5,814,420 A | 9/1998 | Chu |
| 5,919,587 A | 7/1999 | Mukherjee et al. |
| 5,961,672 A | 10/1999 | Skotheim et al. |
| 5,962,171 A | 10/1999 | Boguslavsky et al. |
| 6,030,720 A | 2/2000 | Chu et al. |
| 6,090,504 A | 7/2000 | Sung et al. |
| 6,117,590 A | 9/2000 | Skotheim et al. |
| 6,174,621 B1 | 1/2001 | Skotheim et al. |
| 6,201,100 B1 | 3/2001 | Gorkovenko et al. |
| 6,245,465 B1 | 6/2001 | Angell et al. |
| 6,302,928 B1 | 10/2001 | Xu et al. |
| 6,319,633 B1 | 11/2001 | Ikeda et al. |
| 6,344,293 B1 | 2/2002 | Geronov |
| 6,358,643 B1 | 3/2002 | Katz et al. |
| 6,613,480 B1 | 9/2003 | Hwang et al. |
| 6,632,573 B1 | 10/2003 | Nimon et al. |
| 6,706,449 B2 | 3/2004 | Mikhaylik et al. |
| 6,733,924 B1 | 5/2004 | Skotheim et al. |
| 6,797,428 B1 | 9/2004 | Skotheim et al. |
| 2002/0034688 A1 | 3/2002 | Chu et al. |
| 2002/0039677 A1 | 4/2002 | Iwamoto et al. |
| 2002/0168574 A1 | 11/2002 | Ahn et al. |
| 2002/0192557 A1 | 12/2002 | Choi et al. |
| 2003/0073005 A1 | 4/2003 | Kim et al. |
| 2003/0175596 A1 | 9/2003 | Park et al. |
| 2003/0180611 A1 | 9/2003 | Mikhaylik et al. |
| 2004/0002002 A1 | 1/2004 | Mizuta et al. |
| 2004/0048164 A1 | 3/2004 | Jung et al. |
| 2004/0101753 A1 | 5/2004 | Hwang |
| 2004/0157132 A1 | 8/2004 | Kim et al. |
| 2004/0219428 A1 | 11/2004 | Nagayama |
| 2005/0221192 A1* | 10/2005 | Hennige et al. ............... 429/246 |
| 2005/0244693 A1 | 11/2005 | Strutt et al. |
| 2006/0024579 A1 | 2/2006 | Kolosnitsyn et al. |
| 2006/0051643 A1 | 3/2006 | Sarkar et al. |
| 2006/0121355 A1 | 6/2006 | Kolosnitsyn et al. |
| 2006/0177741 A1 | 8/2006 | Kolosnitsyn et al. |
| 2006/0234126 A1 | 10/2006 | Kolosnitsyn et al. |
| 2007/0072076 A1 | 3/2007 | Kolosnitsyn et al. |
| 2007/0281210 A1 | 12/2007 | Kolosnitsyn et al. |
| 2008/0038645 A1 | 2/2008 | Kolosnitsyn et al. |
| 2008/0100264 A1 | 5/2008 | Kolosnitsyn et al. |
| 2009/0053565 A1 | 2/2009 | Iacovelli |
| 2012/0282530 A1* | 11/2012 | Chiang et al. ................ 429/336 |

FOREIGN PATENT DOCUMENTS

| | | | |
|---|---|---|---|
| EP | 1420475 A2 | 5/2004 | |
| JP | 59194361 | 11/1984 | |
| JP | 08069812 | 3/1996 | |
| JP | 08138650 | 5/1996 | |
| JP | 08-298229 | 11/1996 | |
| JP | 08-298230 | 11/1996 | |
| JP | 09-147913 | 6/1997 | |
| JP | 63-081767 | 4/1998 | |
| JP | 10284076 | 10/1998 | |
| KR | 10-2002-0089134 | 11/2002 | |
| KR | 10-0368753 | 4/2003 | |
| KR | 10-2003-0056497 | 7/2003 | |
| WO | WO 01/97304 | 12/2001 | |
| WO | WO 2004-021475 | * 3/2004 | ............... H01M 2/16 |

OTHER PUBLICATIONS

U.S. Appl. No. 12/527,701, filed Jun. 18, 2009, Kolosnitsyn et al.
UK Search Report under Section 17 from Application No. GB 0416708 6, dated Aug. 10, 2004.
Yamin H., Peled E., "Electrochemistry of a Nonaqueous Lithium/Sulphur Cell," J. of Power Sources, 1983, vol. 9, pp. 281-287.
D. Aurbach, E. Zinigrad, Y. Cohen, H. Teller; "A Short Review of Failure Mechanism of Lithium Metal and Lithiated Graphite Anodes in Liquid Electrolyte Solutions"; Solid State Lonics; 2002; vol. 146; pp. 405-416.
Zhong et al., J. Electrochem. Soc., 1997, 144, 205-213.
Duck-Rye Chang, Suck-Hyun Lee, Sun-Wook Kim, Hee-Tak Kim "Binary Electrolyte Based on Tetra (ethylene glycol) Dimethyl Ether and 1,3-dioxolane for Lithium-Sulphur Battery" J. Power Sources, 2002, vol. 112, pp. 452-460.
Ein-Eli et al., J. Electrochem. Soc., 1997, 144, L205-L207.
Ein-Eli et al., J. Electrochem. Soc., 1996, 143, L273-L277.
J. Paris, V. Plichon, "Electrochemical Reduction of Sulphur in Dimethylacetamide", Electrochimica Acta, 1981, vol. 26, No. 12, pp. 1823-1829.
Bach et al., J. Power Sources, 1993, 43-44,569-575.
Levillain E, Gaillard F., Leghie P., Demortier A., Lelieu J.P., "On the Understanding of the Reduction of Sulphur (S8) in Dimethylformamide (DMF)", J. of Electroanalytical Chemistry, 1997, vol. 420. pp. 167-177.
J. Broadhead, T. Skotheim: "A safe, fast-charge, two-volt lithium/polymer cathode 'AA'-size cell with a greater than 250 Wh kg-1 energy density", Journal of Power Sources, 65 (1997),1-2, 213-218.

(56) References Cited

OTHER PUBLICATIONS

Peled E., Gorenshrein A., Segal M., Sternberg Y; "Rechargeable Lithium-Sulphur Battery (extended abstract )"; J. of Power Sources; 1989; vol. 26; pp. 269-271.

Peled E., Sternberg Y., Gorenshtein A., Lavi Y., "Lithium-Sulphur Battery: Evaluation of Dioxolane-Based Electrolytes," J. Electrochem. Soc., 1989, vol. 136, No. 6, pp. 1621-1625.

Rauh R.D., Abraham K.M., Pearson G.F., Surprenant J.K., Brummer S.B., "A Lithium/Dissolved Sulphur Battery with an Organic Electrolyte", J. Electrochem. Soc., 1979, vol. 126, No. 4, pp. 523-527.

Rauh R.D., Shuker F.S., Marston J.M., Brummer S. B., "Formation of Lithium Polysulphides in Aprotic Media" J. inorg. Nucl. Chem., 1977, vol. 39, pp. 1761-1766.

Shin-Ichi Tobishima, Hideo Yamamoto, Minoru Matsuda, "Study on The Reduction Species of Sulphur by Alkali Metals in Nonaqueous Solvents," Electrochimica Acta., 1997, vol. 42, No. 6, pp. 1019-1029.

Taitiro Fujnaga, Tooru Kuwamoto, Satoshi Okazaki, Masashi Horo, "Electrochemical Reduction of Elemental Sulphur in Acetonitrile", Bull. Chem. Soc. Jpn., 1980, vol. 53, pp. 2851-2855.

Tarascon and Guyomard, J. Electrochem. Soc., 1991, No. 138, pp. 2864-2868.

Yamin H., Gorenshtein A., Penciner J., Sternberg Y., Peled E. "Lithium Sulphur Battery. Oxidation/Reduction Mechanisms of Polysulphides in THF solution", J. Electrochem. Soc., 1988, vol. 135, No. 5, pp. 1045-1048.

Yamin H., Penciner J., Gorenshtein A., Elam M., Peled E., "The Electrochemical Behavior of Polysulphides in Tetrahydrofuran," J. of Power Sources, 1985, vol. 14, pp. 129-134.

Office Action of U.S. Appl. No. 11/290,825, mailed on Jun. 11, 2009.
Office Action of U.S. Appl. No. 11/332,471, mailed on Jul. 31, 2009.
Office Action of U.S. Appl. No. 11/332,471, mailed on Feb. 26, 2009.
Office Action of U.S. Appl. No. 11/332,471, mailed on Aug. 27, 2008.
Office Action of U.S. Appl. No. 11/332,471, mailed on Sep. 28, 2007.
Office Action of U.S. Appl. No. 11/332,471, mailed on Mar. 11, 2008.
Office Action of U.S. Appl. No. 11/332,471, mailed on Feb. 20, 2007.
Office Action of U.S. Appl. No. 11/332,471, mailed on Aug. 21, 2007.
Office Action of U.S. Appl. No. 11/386,113, mailed on Jan. 6, 2009.
Office Action of U.S. Appl. No. 11/386,113, mailed on Aug. 19, 2008.
Office Action of U.S. Appl. No. 11/386,113, mailed on Feb. 5, 2008.
Office Action of U.S. Appl. No. 11/526,876, mailed on Oct. 30, 2009.
Office Action of U.S. Appl. No. 11/889,334, mailed on Aug. 14, 2009.
Definitions of "slurry" and "suspension", Merriam Webster's, Collegiate Dictionary (10th Edition), printed Feb. 4, 2008.

Chagnes A. et al. "Butyrolactone-ethylene Carbonate Based Electrolytes for Lithium-Ion Batteries", Journal of Applied Electrochemistry vol. 33, pp. 589-595, Netherlands Feb. 5, 2003.

Komaba S. et al. "Inorganic Electrolyte Additives to Suppress the Degradation of Graphite Anodes by Dissolved Mn(II) for Lithium-Ion Batteries", Journal of Power Sources 119-121, pp. 378-382, 2003.

Linden D. et al. "Handbook of Batteries", Third ed., Mcgraw-Hill, New York, 2001.

Pereira-Ramos, J. et al. "Sulfone-Based Electrolytes for Lithium Intercalation Batteries", Journal of Power Sources, vol. 16, Nov. 1985, p. 193-204.

Office Action for Korean Patent Application No. 10-2007-7003959 mailed May 23, 2012.

Office Action for Japanese Patent Application No. 2007-523142 mailed Sep. 9, 2011.

International Search Report for PCT/GB2005/002850 mailed Aug. 25, 2005.

* cited by examiner

BATTERY ELECTRODE STRUCTURE

PRIOR APPLICATION DATA

The present application is a continuation of U.S. patent application Ser. No. 11/190,203, filed Jul. 27, 2005, which claimed benefit from U.S. Provisional Application No. 60/591,083, filed on Jul. 27, 2004 and entitled "Improvements Relating to Electrode Structures in Batteries" and from UK Application No. 0416708.6, filed on Jul. 27, 2004, each of which is incorporated herein by reference in its entirety.

TECHNICAL FIELD

The present invention relates to chemical sources of electric energy comprising positive electrodes (cathodes) and negative electrodes (anodes). In particular, the invention relates to rechargeable (secondary) and non-rechargeable (primary) battery cells comprising a negative electrode providing ions (anode), an intermediate separator element containing an electrolyte solution or a hard polymer electrolyte through which ions from a source electrode material move between cell electrodes during charge and discharge cycles of the cell, and a positive electrode (cathode) comprising an electrode depolarizer substance (cathode active material). One or both of the positive and the negative electrodes is coated with a porous electrochemically active material. The invention is particularly useful for making such cells in which the ion source electrode is lithium, a lithium compound or other material capable of providing ions, where an electrode separator membrane comprises a liquid, gel or hard electrolyte, which allows mobility for the lithium or other ions, and where the cathode is a porous multi-component solid.

BACKGROUND OF THE INVENTION

Throughout this application various patents and published patent applications are referred to by an identifying citation. The disclosures of the patents and published patent applications referred to in this application are hereby incorporated by reference into the present disclosure to more fully describe the state of the art to which this invention pertains.

An electroactive material that has been fabricated into a structure for use in a battery is referred to as an electrode. Of a pair of electrodes used in a battery, herein referred to as a chemical source of electrical energy, the electrode on the side having a higher electrochemical potential is referred to as the positive electrode, or the cathode, while the electrode on the side having a lower electrochemical potential is referred to as the negative electrode, or the anode.

An electrochemically active material used in the cathode or positive electrode is referred to hereinafter as a cathode active material. An electrochemically active material used in the anode or negative electrode is hereinafter referred to as an anode active material. Multi-component compositions possessing electrochemical activity and comprising an electrochemically active material and optional electron conductive additive and binder, as well as other optional additives, are referred to hereinafter as electrode compositions. A chemical source of electrical energy or battery comprising a cathode with the cathode active material in an oxidized state and an anode with the anode active material in a reduced state is referred to as being in a charged state. Accordingly, a chemical source of electrical energy comprising a cathode with the cathode active material in a reduced state, and an anode with the anode active material in an oxidized state, is referred to as being in a discharged state.

The value of the free space of voids in the electrode (cathode or anode) composition expressed in the percentages from the overall volume of the electrode (cathode or anode) composition layer is hereinafter referred to as a porosity of the electrode (cathode or anode) active layer.

Since batteries continue to evolve, and particularly as lithium batteries become more widely accepted for a variety of uses, the need for safe, long lasting, high energy density, and lightweight batteries becomes more important. There has been considerable interest in recent years in developing high energy density cathode active materials and alkali metals as anode active materials for high energy primary and secondary batteries.

To achieve high capacity in chemical sources of electrical energy or batteries, it is desirable to have a high quantity or loading of electroactive material in the cathode or anode active layer. For example, the volume of the cathode active layer in an AA size battery is typically about 2 $cm^3$. If the specific capacity of the electroactive material is very high, for example 1000 mAh/g, the amount or volumetric density of the electroactive material in the cathode active layer would need to be at least 500 $mg/cm^3$ in order to have the 1 g of cathode active material in the AA size battery necessary provide a capacity of 1000 mAh. If the volumetric density of electroactive material in the cathode active layer can be increased to higher levels, such as greater than 900 $mg/cm^3$, the capacity of the battery may be proportionately increased to higher levels if the specific capacity of the electroactive material does not decrease significantly when the cathode active layer becomes denser and less porous.

There are a wide variety of electroactive materials that may be utilized in the cathode active layers of chemical sources of electrical energy. For example, a number of these are described in U.S. Pat. No. 5,919,587 to Mukherjee et al. These electroactive materials vary widely in their specific densities ($g/cm^3$) and in their specific capacities (mAh/g) so the desired volumetric densities in $mg/cm^3$ of the electroactive material in the cathode active layer correspondingly vary over a wide range. Lithium and sulphur are highly desirable as the electrochemically active materials for the anode and cathode, respectively, of chemical sources of electrical energy because they provide nearly the highest energy density possible on a weight or volume basis of any of the known combinations of active materials. To obtain high energy densities, the lithium may be present as the pure metal, in an alloy, or in an intercalated form, and the sulphur may be present as elemental sulphur or as a component in an organic or inorganic material with high sulphur content, preferably above 75 weight percent sulphur. For example, in combination with a lithium anode, elemental sulphur has a specific capacity of 1680 mAh/g. This high specific capacity is particularly desirable for applications, such as portable electronic devices and electric vehicles, where low weight of the battery is important.

Practical battery cells comprising the electroactive cathode and anode materials also typically contain other non-electroactive materials such as a container, current collectors, separator and electrolyte, in addition to polymeric binders, electrically conductive additives, and other additives in the electrodes. The electrolyte is typically an aqueous or non-aqueous liquid, gel or solid material containing dissolved salts or ionic compounds with good ionic conductance, but with poor electronic conductivity. All of these additional non-electroactive components are typically utilized to make the battery perform efficiently, but they also contribute to a reduction of the gravimetric and volumetric energy density of the cell. It is, therefore, desirable to keep the quantities of these non-electroactive materials to a minimum so as to maximize the amount of electroactive material in the battery cell.

To achieve the highest possible volumetric density of the electroactive material in the cathode or anode active layer, it is desirable to maximize the weight percent for electroactive materials in the cathode or anode active layer, for example up to 65-85 weight percent, and to maintain the porosity or air voids in the cathode or anode active layer as low as possible, for example, in the range of 30 to 60 volume percent. In particular, the porosity of the cathode active layer must be kept low because higher porosities, such as, for example, 70 to 85 volume percent, do not provide enough electroactive material to obtain very high cell capacities.

Electroactive materials are typically electrically non-conducting or insulative and are generally not microporous. To overcome the insulative properties of electroactive materials, certain amounts of electrically conductive fillers, such as conductive carbons, are typically added to the cathode active layer. Typically, the electrically conductive fillers are present in amounts of about 5 to 40% by weight of the cathode active layer. For example, U.S. Pat. No. 4,303,748 to Armand et al. describes solid composite cathodes containing an ionically conductive polymer electrolyte together with elemental sulphur, transition metal salts, or other cathode active materials for use with lithium or other anode active materials. U.S. Pat. No. 3,639,174 to Kegelman describes solid composite cathodes comprising elemental sulphur and a particulate electrical conductor. U.S. Pat. No. 5,460,905 to Skotheim describes the use of p-doped conjugated polymers, together with an effective amount of conductive carbon pigments, for the transport of electrons in cathodes. U.S. Pat. Nos. 5,529,860 and 6,117,590, both to Skotheim et al., describe the use of conductive carbons and graphites, conductive polymers, and metal fibres, powders, and flakes with electroactive materials.

It would be advantageous significantly to increase the volumetric densities of cathode or anode active layers comprising electroactive materials without sacrificing the high specific capacity of these materials, i.e., without reducing the desired high electrochemical utilization, such as, for example, greater than 50% utilization, during cycling of the cells. Particularly as the thickness of the cathode or anode active layer is increased, it becomes progressively more difficult to achieve the electrical conductivity and the microporosity needed for highly efficient electrochemical utilization of the active materials.

Some improvement in the methods of forming solid composite cathodes with cathode active layers which comprise an electroactive sulphur-containing material and an electrically conductive material are described in U.S. Pat. No. 6,302,928 to Xu et al. This patent refers to a method of forming electric current producing cells, wherein the electroactive sulphur-containing material is heated to a temperature above its melting point to form a melt layer and then is resolidified to form a cathode active layer. This method is not free of significant drawbacks, since obtaining a high density of sulphur-containing active material reduces its porosity and hence the availability of the active material. Besides, this method is not applicable to the other active cathode materials that have a melting temperature too high for producing cathodes in the way described in the said U.S. Pat. No. 6,302,928.

Another method to increase the volumetric density of the cathode active layer is by compressing or calendering the layer to a reduced thickness. It would be very advantageous to be able to compress or calender the cathode active layer to a 20% or greater reduction in thickness without sacrificing the desired high electrochemical utilization of the electroactive sulphur-containing materials. This is difficult to achieve when high levels of non-electroactive materials are present in the cathode active layer, particularly when polymeric binders are used, such that the electrochemical utilization, as expressed in the specific capacity of the electroactive material in the cell, is typically significantly reduced when the cathode active layer is significantly reduced in thickness by compressing or calendering of the whole cathode layer. On the other hand, significantly reducing the levels of the non-electroactive materials in the cathode active layer, particularly those materials with binding properties, greatly reduces the mechanical integrity and cohesive and adhesive properties of the cathode active layer.

As mentioned above, the porous electrodes of the chemical sources of electrical energy are usually multi-component solids, comprising an electrode depolarizer (the liquid or hard active substance), an electron conducting additive (the substance providing transport of electrons to the depolarizer), and a binder (the substance ensuring the mechanical strength of the electrodes). The electrodes may also include auxiliary components improving the mechanical and electrochemical properties of the electrode materials. The electrode pores are filled up with electrolyte (a liquid or a hard substance possessing ion conductivity). An electrochemical reaction occurs at the three-phase interface of the depolarizer, electron conductor and ion conductor. The electrochemical reaction efficiency is determined by the electrochemical properties of the depolarizer and by the ion and electron conductance of the electrode. The ion conductivity is usually much (1 to 3 orders of magnitude) lower than the electron conductivity of the electrode. Thus, the value of the electrochemical overvoltage that determines the speed of the electrochemical reaction is in turn defined by the ion resistance of the electrode. The maximum values of electrochemical overvoltage and the maximum speed of the electrochemical reaction are reached at the face side of the electrode (the surface turned towards the opposite electrode of the chemical source of electric energy). The minimal values are reached at the rear side of the electrode (the surface turned to the current collector of the electrode). As a result, the depolarizer is consumed to a greater extent at the layers close to the face side of the electrode and to a lesser extent at the layers of the electrode close to its rear side. The gradient of the overvoltage and hence the gradient of the current density over the electrode thickness grows with the increase of the overall current density of the chemical sources of electric energy. This leads to an increase in the heterogeneity of the reaction distribution over the electrode thickness and in extreme cases to a full ousting of the electrochemical reaction to the surface of the electrode.

The electrochemical overvoltage in the cathodes of the chemical sources of electrical energy has a diffusion (concentration) nature. The current density controlled by diffusion is determined by the ratio of the electrolyte volume inside the pores and the area of the working surface of the electrode. In particular, the current density is reduced as this ratio is decreased.

In particular, the porosity value is crucial for chemical sources of electrical energy with soluble depolarizers, examples of which are the systems: $Li-SO_2$; $Li-SOCl_2$; $Li-S$.

Despite the various approaches proposed for the fabrication of high energy density chemical sources of electrical energy comprising various electroactive materials, there remains a need for improved solid composite cathodes and anodes comprising an active layer which has a combination of high electrochemical utilization and a high volumetric density of the electroactive material, while retaining or improving the desirable properties of electrical conductivity, mechanical strength, cohesive strength, and adhesion to the adjacent layers in the porous solid composite electrodes utilizing electroactive materials.

On the one hand, an increase in the density of the electrodes (decrease in porosity) produces an increase of the energy density of chemical sources of electrical energy. On the other hand, a decrease in porosity reduces the ion conductivity of the electrodes and hence makes the electrochemical reaction conditions and the utilization of active materials worse.

SUMMARY OF THE INVENTION

The applicant has found that the non-uniform distribution of the electrochemical reaction rate over the electrode thickness leads to non-uniform consumption of the depolarizer and hence to a reduction of the electrode capacity. Therefore, equalization of the electrochemical overvoltage value over the electrode thickness is desirable to increase the efficiency of the depolarizer utilization. The applicant has found that this task can be addressed by the use of electrodes with a porosity gradient over the thickness, namely the electrodes having the porosity that increases from the face side towards the rear side. In other words, it would be expedient for getting better results in the capacity and power of chemical sources of electrical energy to use electrodes with varying porosity, namely electrodes having a porosity that decreases from the back to the face side.

According to a first aspect of the present invention, there is provided an electrode structure for a chemical source of electric energy, the electrode structure comprising at least a current collector and an electrode composition provided on the current collector, wherein
a) said electrode composition includes an electrochemically active material;
b) said electrode composition is provided on the current collector in one or several layers and has an inside surface proximal to the current collector and an outside surface distal from the current collector; and
c) said electrode composition has a non-uniform porosity that decreases in a direction from the inside surface towards the outside surface.

According to a second aspect of the present invention, there is provided a method of producing an electrode structure for a chemical source of electric energy, the method comprising the steps of:
a) providing a current collector;
b) coating a layer or a plurality of successive layers of an electrode composition on the current collector so as to produce a coating having an inside surface proximal to the current collector and an outside surface distal from the current collector;
c) using a coating process or post-treating the coating so that the coating has a non-uniform porosity that decreases in a direction from the inside surface towards the outside surface.

According to a third aspect of the present invention, there is provided a cell or battery including an electrode structure according to the first aspect or made by the method of the second aspect.

The electrode composition may be provided on the current collector by way of a deposition process. Where only one layer is provided, this layer must be deposited or post-treated in such a way that the porosity decreases from the inside surface to the outside surface as required. This will generally result in a continuous or smooth porosity gradient. Alternatively, where the electrode composition comprises a plurality of layers, the decrease in porosity can be achieved by deposition of successive layers with decreasing individual porosities, thus forming a stepped porosity gradient. It is also possible to use successive layers each with a decreasing porosity gradient in the direction from the inside to the outside.

The electrode composition may be provided as a slurry for deposition onto the electrode structure.

The electrochemically active material of the electrode composition may optionally include an electron conductive additive, a binder, and other optional additives as will be described in more detail hereinbelow.

The porosity gradient may be controlled by varying a content of solid substance in the slurry, by a composition of a solvent in the slurry, by a drying temperature of the or each layer after deposition, and also by pressing or calendering conditions for the or each layer after deposition.

The electrode structures of embodiments of the present invention can be used in electrolytic electric cells, rechargeable batteries, fuel cells and other applications demanding high energy density and high power.

The electrode structure may be configured as a positive electrode (cathode) or a negative electrode (anode).

DESCRIPTION OF THE DRAWINGS

For a better understanding of the present invention and to show how it may be carried into effect, reference shall now be made by way of example to the accompanying drawings, in which.

DESCRIPTION OF THE INVENTION

Figure 1:
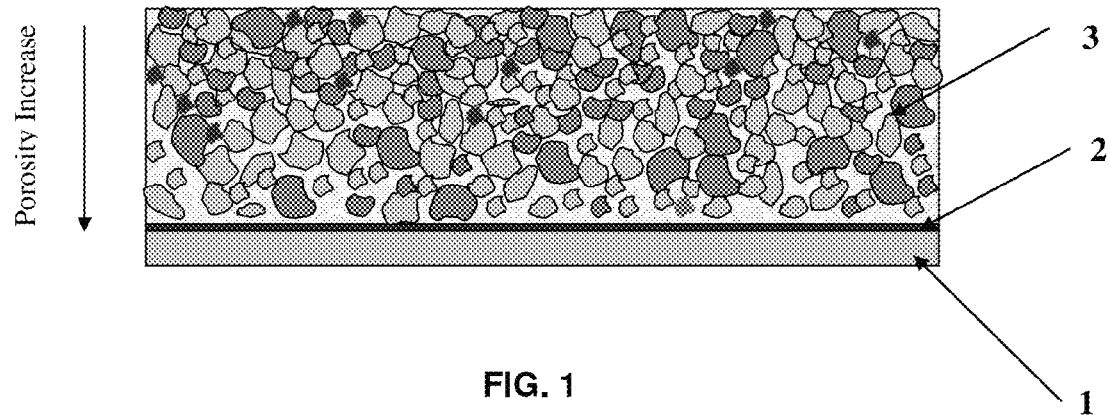
FIG. 1 is a schematic cross-section through a first embodiment of the present invention.

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

The problem of production of improved solid composite electrodes comprising an electrode active layer which has a combination of high electrochemical utilization and a high volumetric density of the electroactive material, while retaining or improving the desirable properties of electrical conductivity, mechanical strength, cohesive strength, and adhesion to adjacent layers, is addressed in embodiments of the present invention by designing a method of production of solid composite electrodes with a porosity gradient.

When forming electrode structures of embodiments of the present invention, the following process steps may be included:
1) Physical pounding or grinding and homogenising of a mixture comprising at least an electrode active material and an optional electron conductive material, binder and other optional additives.
2) Preparation of a slurry from the homogenised mixture in solvent or a mixture of solvents.
3) Deposition of a layer of the slurry onto a current collector.

4) Drying the resulting active electrode active layer.
5) Optional deposition of one or more further layers of the slurry on top of the first layer, with intermediate and final drying.
6) Compressing or calendaring the resulting single- or multi-layer electrode structure or at least the deposited slurry.
7) Each deposited layer of slurry may be compressed or calendered prior to the deposition of the next layer.
8) Different slurries may be used for different layers.

The pounding or grinding of the components of the electrode composition can be done by any appropriate known method, for example using a ball mill, an impeller mill or others. The time of homogenization is preferably chosen to provide a resulting particle size of about 1-2 micrometers.

The preparation of the slurry can be undertaken in any appropriate known mixer, for example a ball mill, an impeller mixer or others, so as to produce a homogeneous suspension. The slurry is preferably mixed for long enough so as to ensure full dilution or swelling of the binder (when used).

The current collector can be a copper or aluminium mesh or grid, a copper foil, an aluminium foil, an aluminium foil coated with a conductive carbon layer, aluminium coated polymer film, conductive polymer film or any other conductive film possessing corrosion stability when used in electrolyte systems. Other forms of current collector and conductive materials are not excluded.

The deposition of the slurry onto the surface of the current collector can be undertaken by any method providing a substantially uniform coating layer on the whole surface of the current collector. For example, it can be by way of a doctor blade method, a wired draw rod method, screen printing or other methods.

The solvent can be removed from the slurry layer by evaporation at normal or reduced pressure, and at ambient or elevated temperature. The speed of solvent removal is preferably kept substantially uniform along the surface of the slurry layer. The evaporation speed is preferably kept at a level to prevent stratification of the slurry or agglomeration of particles present in the slurry.

Compression of the electrode active layer can be achieved by pressing, calendering or other known methods providing the desired conditions (desired pressure to the surface unit) and physical parameters of the electrode active layer (thickness, density and porosity). The compression can be performed once or many times until the desired physical properties of the electrode active layer are be obtained.

The electrode composition may include an electrode active material selected from:
1) For the positive electrode (cathode): sulphur, non-organic or organic (including oligomeric or polymeric) compounds based on sulphur, as well as simple and complex metal oxides, sulphides, their mixtures, other electroactive materials or mixtures of the abovementioned materials.
2) For the negative electrode (anode): metal powders, alkali metal-carbon and alkali metal-graphite intercalates, their mixtures, other electroactive materials or mixtures of the abovementioned materials. A particularly effective alkali metal in this context is lithium.

When the electrode structure is configured as a positive electrode, the electrode active material may be present in a range of 5 to 95% of the overall weight of the electrode composition, comprising the electrode active material, the electron conductive material and the binder. In a particularly preferred embodiment, the proportion of electrode active material in the electrode composition is not less than 70% by weight, although in other embodiments it may be up to 70% by weight.

The electron conductive material may comprise one or more of conductive polymers, carbon or metal fibres, powders, or flakes. Where carbon powder is used, it may be in the form of soot, various types of carbon black or other carbon materials and their mixtures.

Where a binder is used, this may be a polymer or a mixture of polymers that can be selected from but not limited to: polyethylene oxides, polypropylene oxides, polyacrylonitriles, polysiloxanes, polyimides, polyphosphazenes, polyethers, sulfonated polyimides, perfluorinated polymers, polydivinyl polyethylene glycols, polyethylene glycol diacrylates, polyethylene glycol dimethacrylates, polyarylsulfones, mixtures and derivatives of said polymers, and copolymers that include repeating units of said polymers The binder may be present in a range of 0.5 to 30% of the overall weight of the electrode active material, the electron conductive material and the binder.

The amount of solid substance in the slurry may be from 5 to 50% by weight.

Where a multilayer coating is applied to the current collector, the thickness of each layer may be from 0.1 to 10 micrometers. Multilayer coatings with up to 10 layers have been found to be effective, although more layers may be used where appropriate.

A total coating thickness of 1 to 100 micrometers has been found to be effective, although thicker or thinner coatings are not excluded.

Preferably, the total porosity of the electrode composition layer is from 5 to 85%.

Embodiments of the present invention also relate to methods of forming a chemical source of electric energy comprising for example the following steps:
a) anode fabrication by a method described in the present invention or by another method,
b) solid cathode fabrication by the method described in the present invention,
c) placing of an electrolyte between the anode and the cathode and assembling a cell or battery.

Other or different steps may be used. The electrode structure of the present invention is particularly well-suited for lithium or lithium-ion batteries, including lithium-polymer batteries.

Batteries with an operating voltage window of 1.2 to 4.1V have been constructed using the electrode structures of the present invention.

FIG. 1 shows a cross-section through a first embodiment of the present invention, comprising a base cathode or anode layer 1 in the form of a metal foil, and a conductive carbon layer 2 provided on the layer 1. FIG. 1 shows a schematic diagram of the electrode with the continuous porosity gradient, according to one embodiment. An electrode composition 3, e.g. an active electrode composition, including for example an electrochemically active material and optional binders and electron conductive materials is then deposited on the conductive carbon layer 2 in such a way that there is a continuous increase in porosity from an exposed surface of the electrode composition 3 towards the conductive carbon layer 2.

Figure 2:
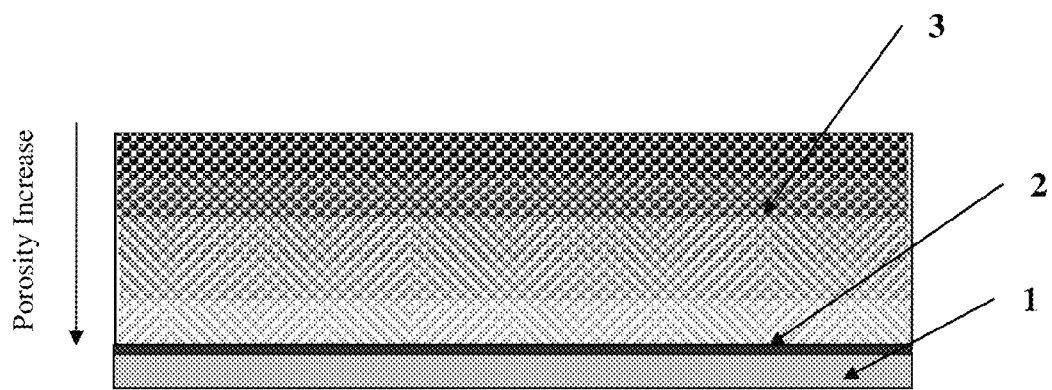
FIG. 2 is a schematic cross-section through a second embodiment of the present invention.

FIG. 2 shows an alternative embodiment, with like parts being labelled as for FIG. 1. FIG. 2 shows a schematic diagram of an embodiment of an electrode with layer-by-layer porosity change. In this alternative embodiment, instead of a single layer of electrode composition 3, there is provided a plurality of successively deposited layers of electrode composition 3, each layer being formed so as to be less porous than the previous layer (in a direction away from the base substrate 1, 2). Composition 3 may be for example an active electrode composition.

Several embodiments of the present invention are described in the following examples, which are offered by way of illustration and not by way of limitation.

EXAMPLE 1

Cathode active layers with a composition by weight of 70% elemental sulphur (available from Fisher Scientific, Loughborough, UK), 10% conductive carbon black (KETJENBLACK® EC-600JD, available from Akzo Nobel Polymer Chemicals BV, Netherlands) and 20% polyethylene oxide (PEO, 4,000,000 molecular weight, available from Sigma-Aldrich Company Ltd, Gillingham, UK) were prepared by the following method. A mixture of dry components was ground in a homogenising system MICROTRON® MB550 for 10-15 minutes. Acetonitrile was added as a solvent to the obtained mixture. The resulting liquid suspension or slurry was mixed for 15-20 hours with a laboratory stirrer DLH. The solids content of the slurry was 10-15 weight percent. The resulting mixture was cast by an automatic film applicator ELCOMETER® SPRL with a doctor blade onto one side of an 18 micrometer thick conductive carbon coated aluminium foil (available from INTELICOAT®, South Hadley, Mass.) as a current collector and substrate. The coating was dried under ambient conditions for 20 hours and then dried under vacuum at 50° C. for five hours.

The resulting dry cathode active layer had a thickness of about 13 micrometers with a loading of the cathode composition of 1.13 mg/cm$^2$. The volumetric density of the electroactive coating was about 870 mg/cm$^3$. The porosity of the cathode active layer was 56%.

EXAMPLE 2

The slurry from Example 1 was cast by an automatic film applicator ELCOMETER® SPRL with onto one side of an 18 micrometer thick conductive carbon coated aluminium foil (available from INTELICOAT®, South Hadley, Mass.) as a current collector and substrate. The doctor blade gap was different from that used in Example 1. The coating was dried under ambient conditions for 20 hours and then dried under vacuum at 50° C. for five hours.

The resulting dry cathode active layer had a thickness of about 21 micrometers with a loading of the cathode composition of 1.35 mg/cm$^2$. The volumetric density of the electroactive coating was about 636 mg/cm$^3$. The porosity of the cathode active layer was 65%.

EXAMPLE 3

A second layer of the slurry was cast by an automatic film applicator ELCOMETER® SPRL on top of the solid composite cathode from Example 1. The new coating was dried under ambient conditions for 20 hours and then dried under vacuum at 50° C. for five hours.

The resulting overall thickness of the dry cathode active layer was 25 micrometers with a loading of the cathode composition of 2.23 mg/cm$^2$. The volumetric density of two layers of the electroactive coating was about 890 mg/cm$^3$. The porosity of the cathode active layer was 55%.

EXAMPLE 4

A second layer of the slurry was cast by an automatic film applicator ELCOMETER® SPRL on top of the solid composite cathode from Example 2. The new coating was dried under ambient conditions for 20 hours and then dried under, vacuum at 50° C. for, five hours.

The resulting overall thickness of the dry cathode active layer was 34 micrometers with a loading of the cathode composition of 2.81 mg/cm$^2$. The volumetric density of two layers of the electroactive coating was about 819 mg/cm$^3$. The porosity of the cathode active layer was 56%.

EXAMPLE 5

A third layer of the slurry was cast by an automatic film applicator ELCOMETER® SPRL on top of the solid composite cathode from Example 3. The new coating was dried under ambient conditions for 20 hours and then dried under vacuum at 50° C. for five hours.

The resulting overall thickness of the dry cathode active layer was 33 micrometers with a loading of the cathode composition of 3.31 mg/cm$^2$. The volumetric density of three layers of the electroactive coating was about 1000 mg/cm$^3$. The porosity of the cathode active layer was 49%.

EXAMPLE 6

A third layer of the slurry was cast by an automatic film applicator ELCOMETER® SPRL on top of the solid composite cathode from Example 4. The new coating was dried under ambient conditions for 20 hours and then dried under vacuum at 50° C. for five hours.

The resulting overall thickness of the dry cathode active layer was 53 micrometers with a loading of the cathode composition of 4.56 mg/cm$^2$. The volumetric density of three layers of the electroactive coating was about 868 mg/cm$^3$. The porosity of the cathode active layer was 53%.

EXAMPLE 7

A fourth layer of the slurry was cast by an automatic film applicator ELCOMETER® SPRL on top of the solid composite cathode from Example 5. The new coating was dried under ambient conditions for 20 hours and then dried under vacuum at 50° C. for five hours.

The resulting overall thickness of the dry cathode active layer was 37 micrometers with a loading of the cathode composition of 3.33 mg/cm$^2$. The volumetric density of four layers of the electroactive coating was about 899 mg/cm$^3$. The porosity of the cathode active layer was 50%.

EXAMPLE 8

One-layer solid composite cathodes were prepared by depositions of the slurry by an automatic film applicator ELCOMETER® SPRL with final drying (as in Example 2). The resulting dry cathode active layer had a thickness of about 21 micrometers with a loading of the cathode composition of 1.35 mg/cm$^2$. The volumetric density of the electroactive coating was about 636 mg/cm$^3$. The porosity of the cathode active layer was 65%.

The one-layer solid composite cathodes thus obtained were subjected to a pressure of 600 kg/cm$^2$. The resulting overall thickness of the dry cathode active layer after pressing was 15 micrometers. The volumetric density of the electroactive coating after pressing was about 1470 mg/cm$^3$. The porosity of the pressed cathode active layer was 24%.

EXAMPLE 9

Two-layer solid composite cathodes were prepared by consecutive depositions of two layers of the slurry by an automatic film applicator ELCOMETER® SPRL with intermediate and final drying (as in Examples 1 and 3). The resulting overall thickness of the dry cathode active layer was 25 micrometers with a loading of the cathode composition of 2.23 mg/cm². The volumetric density of two layers of the electroactive coating was about 890 mg/cm³. The porosity of the cathode active layer was 55%.

The two-layer solid composite cathodes thus obtained were subjected to pressure of 600 kg/cm². The resulting overall thickness of the dry cathode active layer after pressing was 17 micrometers. The volumetric density of the electroactive coating after pressing was about 794 mg/cm³. The porosity of the pressed cathode active layer was 59%.

EXAMPLE 10

The solid composite cathodes obtained after pressing from Example 8 were utilized to form electric current producing cells in a laboratory format of about 12 cm² in area. The electrolyte was a 1M solution of lithium trifluoromethanesulphonate (available from Sigma-Aldrich Company Ltd., Poole Dorset, UK.) in sulfolane. The porous separator used was CELGARD® 2500, a registered trademark of Celgard Inc., available from Celgard K.K., Tokyo, Japan, and also available from Celgard Inc., South Lakes, N.C. USA. The anode was lithium foil of about 50 micrometers in thickness. These components were combined into a layered structure of solid composite cathode/separator/anode with liquid electrolyte filling the void areas of the separator and solid composite cathode to form laboratory cells of about 12 cm² in area. Discharge-charge cycling on these cells was done at 3.6mA or 0.3 mA/cm² with discharge cut-off at a voltage of 1.5V and charge cut-off at 2.8V.

The specific capacities and the volumetric capacities of the electroactive material in the laboratory cells at the 1st, 5th and 10th discharge cycles are shown below:

| Cycle number | Specific Capacity, mAh/g | Volumetric Capacity, mAh/cm³ |
| --- | --- | --- |
| 1 | 740 | 471 |
| 5 | 685 | 436 |
| 10 | 650 | 413 |

EXAMPLE 11

The solid composite cathodes obtained after pressing from Example 9 were utilized to form electric current producing cells in a laboratory format of about 12 cm² in area. The electrolyte was a 1M solution of lithium trifluoromethanesulphonate (available from Sigma-Aldrich Company Ltd., Poole Dorset, UK.) in sulfolane. The porous separator used was CELGARD® 2500, a registered trademark of Celgard Inc., available from Celgard K.K., Tokyo, Japan, and also available from Celgard Inc. South Lakes, N.C. USA. The anode was lithium foil of about 50 micrometers in thickness. These components were combined into a layered structure of solid composite cathode/separator/anode with liquid electrolyte filling the void areas of the separator and solid composite cathode to form laboratory cells of about 12 cm² in area. Discharge-charge cycling on these cells was done at 3.6 mA or 0.3 mA/cm² with discharge cut-off at a voltage of 15V and charge cut-off at 2.8V.

The specific capacities the volumetric capacities of the electroactive material in the laboratory cells at the 1st, 5th and 10th discharge cycles are shown below:

| Cycle number | Specific Capacity, mAh/g | Volumetric Capacity, mAh/cm³ |
| --- | --- | --- |
| 1 | 860 | 765 |
| 5 | 835 | 743 |
| 10 | 820 | 730 |

EXAMPLE 12

A cathode active layer with a composition by weight of 80% electrolytic manganese dioxide, 10% conductive carbon black (KETJENBLACK® EC-600° JD, available from Akzo Nobel Polymer Chemicals BV, Netherlands) and 10% KYNAR FLEX® 2801 was prepared by the following method. A mixture of dry components was ground in a homogenising system MICROTRON® MB550 for 10-15 minutes. Acetone was added as a solvent to the mixture thus obtained. The resulting liquid suspension or slurry was mixed for 15-20 hours with a laboratory stirrer DLH. The solids content of the slurry was 20-25 weight percent. The resulting mixture was cast by an automatic film applicator ELCOMETER® SPRL with a doctor blade onto one side of an 18 micrometer thick conductive carbon coated aluminium foil (available from INTELICOAT®, South Hadley, Mass.) as a current collector and substrate. The coating was dried under ambient conditions for 20 hours and then dried under vacuum at 50° C. for five hours.

The resulting dry cathode active layer had a thickness of about 17 micrometers with a loading of the cathode composition of 3.5 mg/cm². The volumetric density of the electroactive coating was about 2059 mg/cm³. The porosity of the cathode active layer was 54%.

EXAMPLE 13

A second layer of the slurry was cast by an automatic film applicator ELCOMETER® SPRL on top of the solid composite cathode from Example 12. The new coating was dried under ambient conditions for 20 hours and then dried under vacuum at 50° C. for five hours.

The resulting overall thickness of the dry cathode active layer was 24 micrometers with a loading of the cathode composition of 5.47 mg/cm². The volumetric density of two layers of the electroactive coating was about 2378 mg/cm³. The porosity of the cathode active layer was 46.5%.

EXAMPLE 14

An anode active layer with a composition by weight of 85% natural graphite, 5% conductive carbon black (KETJENBLACK® EC-6001D, available from Akzo Nobel Polymer Chemicals BV, Netherlands) and 10% KYNAR FLEX® 2801 was prepared by the following method. A mixture of dry components was ground in a homogenising system MICROTRON® MB550 for 10-15 minutes. Acetone was added as a solvent to the mixture thus obtained. The resulting liquid suspension or slurry was mixed for 15-20 hours with a laboratory stirrer DLH. The solids content of the slurry was 20-25 weight percent. The resulting mixture was cast by an automatic film applicator ELCOMETER® SPRL with a doctor blade onto one side of a 15 micrometer thick copper foil as a current collector and substrate. The coating was dried under ambient conditions for 20 hours and then dried under vacuum at 50° C. for five hours.

The resulting dry cathode active layer had a thickness of about 17 micrometers with a loading of the cathode composition of 1.3 mg/cm². The volumetric density of the electroactive coating was about 867 mg/cm³. The porosity of the anode active layer was 59%.

EXAMPLE 15

A second layer of the slurry was cast by an automatic film applicator ELCOMETER® SPRL on top of the solid composite anode from Example 14. The new coating was dried under ambient conditions for 20 hours and then dried under vacuum at 50° C. for five hours.

The resulting overall thickness of the dry anode active layer was 23 micrometers with a loading of the anode composition of 2.38 mg/cm². The volumetric density of two layers of the electroactive coating was about 1035 mg/cm³. The porosity of the cathode active layer was 51%.

While some embodiments of the invention have been illustrated and described, it is clear that the invention is not limited to these specific embodiments. Numerous modifications, changes, variations, substitutions, and equivalents will occur to those skilled in the art without departing from the scope of the present invention.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

The invention claimed is:

1. A lithium sulphur battery comprising:
    a positive electrode, a negative electrode and an intermediate separator element containing an electrolyte solution positioned between said positive electrode and negative electrode,
    wherein the positive electrode has an electrode structure comprising a current collector and a plurality of discrete layers, each layer being composed of an electrode composition having a different porosity than an electrode composition forming another layer,
    wherein the electrode composition of each of the plurality of discrete layers comprises an electrochemically active material comprising sulphur and an electron conductive material
    wherein a first layer of the plurality of discrete layers is in direct contact with the current collector, and wherein a second layer of the plurality of discrete layers is in direct contact with the first layer, and wherein any additional layers of the plurality of discrete layers are in direct contact with an underlying layer of the plurality of discrete layers;
    wherein the porosity of the first layer is higher than the porosity of the second layer and wherein any additional layer has a porosity that is less than the porosity of its underlying layer, wherein the plurality of discrete layers has a total thickness of 1 to 100 μm, and wherein the electrode composition of each of the plurality of discrete layers has an average porosity of 5% to 85%.

2. A battery as claimed in claim 1, wherein the electrochemically active material is selected from the group consisting of: elemental sulphur, non-organic, organic, oligomeric and polymeric compounds based on sulphur, simple and complex sulphides and mixtures thereof.

3. A battery as claimed in claim 1, wherein the electrode composition further includes a binder.

4. A battery as claimed in claim 1, wherein the electrochemically active material constitutes 5% to 95% by weight of any of the electrode compositions.

5. A battery as claimed in claim 1, wherein the electrochemically active material constitutes at least 70% by weight of any of the electrode compositions.

6. A battery as claimed in claim 1, wherein the electron conductive material of each of the electrode compositions is selected from the group consisting of: conductive polymers, carbon fibers, metal fibers, carbon powders, metal powders, carbon flakes and metal flakes.

7. A battery as claimed in claim 3, wherein the carbon powder is selected from the group consisting of: soot and carbon black.

8. A battery as claimed in claim 3, wherein the binder is selected from the group of polymers consisting of: polyethylene oxides, polypropylene oxides, polyacrylonitriles, polysiloxanes, polyimides, polyphosphazenes, polyethers, sulfonated polyimides, perfluorinated polymers, polydivinyl polyethylene glycols, polyethylene glycol diacrylates, polyethylene glycol dimethacrylates and polyarylsulfones.

9. A battery as claimed in claim 3, wherein the binder comprises 0.5% to 30% by weight of the electrode composition.

10. A battery as claimed in claim 1, wherein the electrode structure comprises 2 to 10 discrete layers.

11. A battery as claimed in claim 1, wherein t battery has an operating voltage of 1.2 to 4.1 V.

* * * * *